US010306461B2

(12) United States Patent
Nenner et al.

(10) Patent No.: US 10,306,461 B2
(45) Date of Patent: May 28, 2019

(54) PROVISION OF SUBSCRIBER PROFILE TO A MME IN CASE OF ROAMING

(71) Applicant: DEUTSCHE TELEKOM AG, Bonn (DE)

(72) Inventors: Karl-Heinz Nenner, Bornheim (DE); Dieter Jacobsohn, Bonn (DE)

(73) Assignee: DEUTSCHE TELEKOM AG, Bonn (DE)

( * ) Notice: Subject to any disclaimer, the term of this patent is extended or adjusted under 35 U.S.C. 154(b) by 82 days.

(21) Appl. No.: 15/315,732

(22) PCT Filed: Jun. 2, 2015

(86) PCT No.: PCT/EP2015/062188
§ 371 (c)(1),
(2) Date: Dec. 2, 2016

(87) PCT Pub. No.: WO2015/185517
PCT Pub. Date: Dec. 10, 2015

(65) Prior Publication Data
US 2017/0094499 A1 Mar. 30, 2017

(30) Foreign Application Priority Data

Jun. 3, 2014 (EP) .................................... 14171003

(51) Int. Cl.
*H04W 4/00* (2018.01)
*H04W 8/12* (2009.01)
(Continued)

(52) U.S. Cl.
CPC ............... *H04W 8/12* (2013.01); *H04W 8/06* (2013.01); *H04W 8/183* (2013.01)

(58) Field of Classification Search
CPC ...................................................... H04W 8/18
See application file for complete search history.

(56) References Cited

U.S. PATENT DOCUMENTS

| 5,943,619 A * | 8/1999 | Coyne | H04W 8/12 |
| | | | 455/432.3 |
| 6,529,732 B1 * | 3/2003 | Vainiomaki | H04W 8/12 |
| | | | 370/328 |

(Continued)

FOREIGN PATENT DOCUMENTS

WO    WO 9849860 A2    11/1998

OTHER PUBLICATIONS

GSM Association: "Document IR.88: LTE and EPC Roaming Guidelines (Version 10.0)", Jul. 10, 2013 (Jul. 10, 2013), pp. 1-68, XP055125912, pp. 1-68.

*Primary Examiner* — Shantell L Heiber
(74) *Attorney, Agent, or Firm* — Leydig, Voit & Mayer, Ltd.

(57) ABSTRACT

The invention relates to a method for providing roaming services, for a user equipment, within a mobile communication network, the mobile communication network comprising a core network and an access network, the access network of the mobile communication network comprising at least one radio cell being served by a base station entity, wherein the user equipment is able to be attached to the mobile communication network via the base station entity despite the user equipment being related to a further mobile communication network as the home public land mobile network of the user equipment, wherein the core network comprises a serving core network node and a home subscriber server functionality, wherein the serving core network node provides mobility management functionality regarding the base station entity and thereby provides mobility management functionality regarding the user equipment, wherein the further mobile communication network comprises a further core network, the further core network comprising a further home subscriber server functionality, (Continued)

the further home subscriber server functionality being able to provide subscription profile data regarding the user equipment, wherein upon attachment of the user equipment with the mobile communication network the method comprises the following steps: in a first step, the serving core network node requests, from the home subscriber server functionality and by means of a first request message, subscription profile data regarding the user equipment, in a second step, subsequent to the first step, the home subscriber server functionality requests, from the further home subscriber server functionality and by means of a second request message, subscription profile data regarding the user equipment, in a third step, subsequent to the second step, the further home subscriber server functionality transmits, by means of a first response message, first subscription profile data regarding the user equipment to the home subscriber server functionality, in a fourth step, subsequent to the third step, the home subscriber server functionality transmits, by means of a second response message, second subscription profile data to the serving core network node having requested subscription profile data by means of the first request message, the second subscription profile data corresponding at least in part to the first subscription profile data.

13 Claims, 2 Drawing Sheets

(51) Int. Cl.
    *H04W 8/06*     (2009.01)
    *H04W 8/18*     (2009.01)

(56) References Cited

U.S. PATENT DOCUMENTS

| 6,643,511 | B1 | 11/2003 | Rune et al. | |
| 6,731,932 | B1* | 5/2004 | Rune | H04W 8/12 |
| | | | | 455/422.1 |
| 2011/0117910 | A1* | 5/2011 | Bae | H04W 12/06 |
| | | | | 455/433 |
| 2013/0084829 | A1* | 4/2013 | De Foy | H04W 12/06 |
| | | | | 455/411 |

* cited by examiner

PROVISION OF SUBSCRIBER PROFILE TO A MME IN CASE OF ROAMING

CROSS-REFERENCE TO RELATED APPLICATIONS

This application is a U.S. National Phase application under 35 U.S.C. § 371 of International Application No. PCT/EP2015/062188, filed on Jun. 2, 2015, and claims benefit to European Patent Application No. EP 14171003.8, filed on Jun. 3, 2014. The International Application was published in English on Dec. 10, 2015 as WO 2015/185517 A1 under PCT Article 21(2).

FIELD

The present invention relates inter alia to a method for providing roaming services, for a user equipment, within a mobile communication network.

Furthermore, the present invention relates to a mobile telecommunication network for providing roaming services to a user equipment.

Additionally, the present invention relates to a home subscriber server functionality node for providing home subscriber server functionality in a mobile communication network.

Furthermore, the present invention relates to a program comprising a computer readable program code, and to a computer program product for using a telecommunication network.

BACKGROUND

A mobile communication network is typically used to provide network services for a user equipment within the mobile communication network. For example, the network services being provided by the mobile communication network may be voice call services, short message services (SMS) and/or data services. The network services are provided to the user equipment—which may also be called a terminal or mobile device—when the user equipment is registered and subsequently attached to the mobile communication network. The mobile communication network serving the user equipment may also be called a cellular network or serving network.

During the registration procedure, the serving network may have to verify that the terminal—as identified by its subscriber identity module (SIM) card credentials—possesses a subscription. The information pertinent to a subscription is stored in a home subscriber server (HSS), and contains not only the subscriber identification but also numerous service related parameters applicable to the subscription. The totality of this information may be called a subscription profile. Based on the network cell being used by the user equipment during the registration procedure, the serving network selects a serving core network node having a functionality—for example a visitor location register (VLR) functionality in case of a mobile-services switching center (MSC)—that, among other functions, enables the serving core network node to download a local copy of the relevant part of the subscription profile from the home subscriber server (HSS) for local processing. Thereby, the local copy of the subscription profile is used by the serving core network node to make service-related decisions when the terminal invokes a service—for example starting a voice call without having to contact the home subscriber server (HSS) every time a service is invoked. Moreover, the serving core network node may be used to maintain the terminal's location within the network and/or report specific changes in the local copy of the subscription profile to the home subscriber server (HSS), wherein the specific changes may also include a change of the serving core network node.

Typically, the subscription profile is stored in a home subscriber server (HSS) of the subscriber's home network. The home subscriber server (HSS) may also be called a home location register (HLR). With regard to the registration of the user equipment to the serving core network node, a non-roaming case may be distinguished from a roaming case. In the non-roaming case, the serving network is the home network of the subscriber associated with the user equipment. This means that the user equipment is registered at the serving core network node of the subscriber's home network, wherein the serving core network node retrieves the subscription profile related to the subscriber from the home subscriber server (HSS) within the subscriber's home network. In contrast, the roaming case relates to a situation in which an inbound roamer (i.e. a roaming subscriber from a foreign network) is registered at the serving core network node of the serving network, wherein the serving network and the home network are different networks.

In the roaming-case, the serving core network node has to retrieve the subscriber profile from the foreign home subscriber server (HSS) within the subscriber's home network. Thus, the serving core network node must be technically enabled to identify the inbound roamer's home network, and to communicate with the home network's home subscriber server (HSS). However, the serving core network node typically may not always have all the information about the home network's home subscriber server (HSS) design required to successfully register and attach the inbound roamer to the serving network. Furthermore, only a global route to a roaming gateway in the home network may be provided such that it is the home network's responsibility to locate the proper homer subscriber server (HSS).

Thus, roaming services are typically provided for a user equipment within the serving network by configuring both networks—i.e. the subscriber's home network and the serving network—such that all serving core network nodes of the serving network are enabled to communicate with the home network of each and every inbound roamer. However, this might lead to situations in which the provider of the serving network may be unable to guarantee that the involved nodes of both the home network and the serving network are configured to use interoperable versions of the communication protocol at all times. Therefore, relatively complex technical efforts are required to provide a working communication between all serving core network nodes of the serving network and the home subscriber servers of a plurality of foreign networks. This might be particularly relevant, when the serving network and home network use different standards according to different specification releases and/or when the home network is updated to a newer specification release.

SUMMARY

In an exemplary embodiment, the present invention provides a method for providing roaming services for a user equipment within a mobile communication network. The mobile communication network comprises a core network and an access network, the access network comprising at least one radio cell being served by a base station entity. A further mobile communication network is the home public land mobile network of the user equipment. The core network comprises a serving core network node and one or more home subscriber server functionality nodes. The serving core network node provides mobility management functionality regarding the base station entity and the user equipment. The further mobile communication network comprises a further core network, the further core network comprising one or more further home subscriber server functionality nodes, the one or more further home subscriber server functionality nodes being configured to provide subscription profile data regarding the user equipment. The method comprises the following steps: upon attachment of the user equipment with the mobile communication network, in a first step, the serving core network node requests, from the one or more home subscriber server functionality nodes and via a first request message, subscription profile data regarding the user equipment, in a second step, subsequent to the first step, the one or more home subscriber server functionality nodes request, from the one or more further home subscriber server functionality nodes and via a second request message, subscription profile data regarding the user equipment, in a third step, subsequent to the second step, the one or more home subscriber server functionality nodes receive, via a first response message, first subscription profile data regarding the user equipment from the one or more further home subscriber server functionality nodes, and in a fourth step, subsequent to the third step, the one or more home subscriber server functionality nodes transmit, via a second response message, second subscription profile data to the serving core network node, the second subscription profile data corresponding at least in part to the first subscription profile data.

BRIEF DESCRIPTION OF THE DRAWINGS

The present invention will be described in even greater detail below based on the exemplary figures. The invention is not limited to the exemplary embodiments. All features described and/or illustrated herein can be used alone or combined in different combinations in embodiments of the invention. The features and advantages of various embodiments of the present invention will become apparent by reading the following detailed description with reference to the attached drawings which illustrate the following.

DETAILED DESCRIPTION

Figure 1:
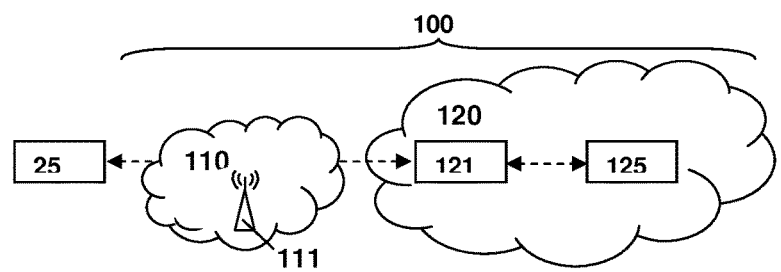
FIG. 1 schematically illustrates a mobile communication network for providing mobility management functionality to a non-roaming user equipment.

Exemplary embodiments of the present invention provide roaming services for a user equipment within a mobile communication network such that operational costs of the mobile communication network can be reduced, wherein the service level of the mobile telecommunications network may be preserved or even extended with regard to the state of the art.

In an exemplary embodiment, the present invention provides a method for providing roaming services, for a user equipment, within a mobile communication network, the mobile communication network comprising a core network and an access network, the access network of the mobile communication network comprising at least one radio cell being served by a base station entity, wherein the user equipment is able to be attached to the mobile communication network via the base station entity despite the user equipment being related to a further mobile communication network as the home public land mobile network of the user equipment, wherein the core network comprises a serving core network node and a home subscriber server functionality, wherein the serving core network node provides mobility management functionality regarding the base station entity and thereby provides mobility management functionality regarding the user equipment, wherein the further mobile communication network comprises a further core network, the further core network comprising a further home subscriber server functionality, the further home subscriber server functionality being able to provide subscription profile data regarding the user equipment, wherein upon attachment of the user equipment with the mobile communication network the method comprises the following steps:

in a first step, the serving core network node requests, from the home subscriber server functionality and via a first request message, subscription profile data regarding the user equipment, in a second step, subsequent to the first step, the home subscriber server functionality requests, from the further home subscriber server functionality and via a second request message, subscription profile data regarding the user equipment, in a third step, subsequent to the second step, the further home subscriber server functionality transmits, via a first response message, first subscription profile data regarding the user equipment to the home subscriber server functionality, and in a fourth step, subsequent to the third step, the home subscriber server functionality transmits, via a second response message, second subscription profile data to the serving core network node having requested subscription profile data via the first request message, the second subscription profile data corresponding at least in part to the first subscription profile data.

It is thereby advantageously possible to provide roaming services for the user equipment within the mobile communication network (serving network), wherein the disadvantages of the state of the art are avoided such that operational costs of the mobile communication network are reduced. Nevertheless, the service level of the mobile telecommunications network is preserved or even extended. By using the home subscriber server functionality for requesting, in the second step, subscription profile data regarding the user equipment from the further home subscriber server functionality and for receiving, in the third step, the first subscription profile data regarding the user equipment from the further home subscriber server functionality, it is advantageously possible that a relatively simple serving core network node can be used and/or that the technical efforts for providing the roaming services are reduced, especially in case that the roaming services are provided to a number of user equipments, each of which being related to a number of distinct further mobile communication networks. Preferably, any information related to the further mobile communication network's home subscriber server (HSS) design and/or infrastructure (for example information related to the communication with the further mobile communication network) is only required at the home subscriber server functionality of the mobile communication network—but not at the serving core network node of the mobile communication network serving the user equipment. Preferably, only the home subscriber server (HSS) functionality of the serving network—but not (any) serving core network node—is enabled to communicate with the further mobile communication network (i.e. the home network of the inbound roamer). Thereby, the technical efforts for providing the roaming services are kept relatively low because a working communication is only required between the home subscriber server (HSS) functionality of the serving network and the further home subscriber server functionality of the further mobile communication network. Especially, the maintenance efforts are reduced with respect to the state of the art, when the serving network and the further mobile communication network are configured to use different standards according to different specification releases and/or when the home network is updated to a newer specification release. It is thereby advantageously possible to use interoperable versions of the communication protocols for the communication between the mobile communication network and the further mobile communication network in a technically simple and efficient manner. For example, in case that only one home subscriber server functionality node of the mobile communication network is enabled to communicate with the further mobile communication network (i.e. the inbound roamer's home network), it is especially advantageously possible that not each and every serving core network node—preferably no serving core network node—needs to communicate with the further mobile communication network. It is furthermore advantageously possible to hide the topology of the mobile communication network with respect to the further mobile communication network.

According to the present invention, it is preferred that the home subscriber server functionality comprises one or more home subscriber server functionality nodes (for example a number of one or more home subscriber server functionality nodes), wherein the home subscriber server (HSS) functionality node is configured for physically storing a local copy of the second subscriber profile data. According to the present invention, it is preferred that in case that the user equipment (or an inbound roamer using the user equipment) registers with the serving network, the serving core network node queries the home subscriber server functionality node in order to request in the same manner as if the serving core network node were serving a non-roaming subscriber the subscription profile data regarding the user equipment.

According to the present invention, it is preferred that the home subscriber server functionality is configured to communicate with one or more distinct further mobile communication networks (or foreign networks) in order to serve all inbound roamers which are related to one of the one or more distinct further mobile communication networks. Preferably, the home subscriber server (HSS) functionality is adapted to obtain the subscriber profile data from the further home subscriber server (HSS) in the further mobile communication network, wherein the home subscriber server functionality retrieves subscription profile data from the further mobile communication network by behaving towards the further mobile communication network as if the home subscriber server functionality node were a serving core network node. Preferably, the home subscriber server (HSS) functionality is thereby adapted to use the interface release and/or specification being supported by the further mobile communication network's home subscriber server.

According to a preferred embodiment of the present invention, the serving core network node provides mobility management functionality, besides regarding the user equipment, also regarding a non-roaming user equipment attached to the mobile communication network, wherein the home subscriber server functionality provides, upon request by the serving core network node, non-roaming subscription profile data regarding the non-roaming user equipment to the serving core network node.

Thereby it is advantageously possible to further simplify the communication of the serving network with the inbound roamer's home network such that—preferably the same home subscriber server (HSS) functionality node—may serve both the non-roaming users and inbound roamers from either all or specific further mobile communication networks (or foreign home networks). Preferably, in case that a specific home subscriber server functionality node has to be selected (from the one or more home subscriber server functionality nodes)—for the roaming or non-roaming user—by using a selection step, the selection step is based on a subscriber identity being used for determining a home network of the subscriber, based on network load and/or based on International Mobile Subscriber Identity (IMSI) ranges.

According to a further preferred embodiment of the present invention, while the user equipment is attached with the mobile communication network, the home subscriber server functionality comprises a local copy of the second subscription profile data, wherein furthermore the method comprises the following steps:

the home subscriber server functionality and the further home subscriber server functionality exchange and/or update first subscriber-related data regarding the user equipment and/or the serving core network node and the home subscriber server functionality exchange and/or update second subscriber-related data regarding the user equipment.

Thereby it is advantageously possible that—while the user equipment is attached to the serving network—that the communication between the serving core network node of the serving network and the home subscriber server functionality of the serving network (having the local copy of the inbound roamer's subscription profile) is performed in the same way as for a non-roaming subscriber according to the state of the art. Furthermore, it is thereby advantageously possible that the communication between the home subscriber server functionality (having the local copy of the inbound roamer's subscription profile) and the further home subscriber server functionality of the further mobile communication network is performed in the same way as a serving core network node would do for inbound roamers according to the state of the art. For example, the exchange of first and/or second subscriber-related data relates to location requests.

According to a further preferred embodiment of the present invention, the second subscription profile data differ with respect to the first subscription profile data such that:

a mobile communication service that is available or allowed in the mobile communication network but is lacking or prohibited in the further mobile communication network is enabled for the user equipment attached to the mobile communication network, and/or a radio access technology that is available or allowed in the mobile communication network but is lacking or prohibited in the further mobile communication network is enabled for the user equipment attached to the mobile communication network, and/or a mobile communication service that is lacking or prohibited in the mobile communication network but is available or allowed in the further mobile communication network is disabled for the user equipment attached to the mobile communication network, and/or a radio access technology that is lacking or prohibited in the mobile communication network but is available or allowed in the further mobile communication network is disabled for the user equipment attached to the mobile communication network, and/or the second subscription profile data correspond to subscription profile data generated in view of the mobile communication services of the mobile communication network available to the user equipment, wherein the subscription profile data is adapted to the first subscription profile data.

Thereby it is advantageously possible to enable inbound roamers to use access network technologies and/or services, which may be unavailable or not configured for the inbound roamer in the inbound roamer's home network. In particular, the inbound roamer may use services of the serving network even when a subscription profile of the inbound roamer does not contain parameters required for the corresponding service. According to one example, the inbound roamer is enabled to use the long term evolution (LTE) standard for wireless communication which is not provisioned for the inbound roamer in the inbound roamer's home network. It is thereby advantageously possible to even extend the roaming services for the user equipment with regard to the state of the art.

According to the present invention, it is preferred that, after receiving the first subscription profile data from the further mobile communication network, the mobile communication network generates the subscription profile data by adding missing parameters and/or by replacing existing parameters, preferably according to local rules or agreements between a network operator of the mobile communication network and a further network operator of the further mobile communication network. For example, in case that specific service parameters are excluded from the first subscription profile data received from the further mobile communication network at the home subscriber server functionality—for example specific service parameters related to the use of voice over long term evolution (VoLTE) or to the use of LTE—the home subscriber server functionality of the mobile communication network generates missing parameters. Preferably, the missing parameters are generated based on general rules of the serving network and/or based on the identity of the home network—for example by using agreements between the home and the serving networks. According to the present invention, it is preferred that at least valid authentication parameters are received from the further mobile communication network as part of the first subscription profile data, wherein the home subscriber server functionality is preferably configured to generate all other subscription parameters required for providing the roaming services to the user equipment. The serving network may replace parameters existing in the first subscription profile data such that services are enabled and/or disabled (even though not indicated by the first subscription profile data) and/or such that an optimized service delivery is provided in the serving network. It is thereby advantageously possible that the home subscriber server functionality of the serving network has a fully functioning subscription profile (in particular in form of the subscription profile data) for providing the roaming services to the user equipment, wherein the home subscriber server functionality provides a copy of a part of the subscription profile (second subscription profile data) to the serving core network node as it would do for a non-roaming subscriber. This means, in particular, that the second subscription profile data are specifically adapted for use by the serving core network node.

According to a further preferred embodiment of the present invention, the serving core network node corresponds, dependent on the access technology used, to a mobile switching center and/or to a serving GPRS (General Packet Radio System) support node and/or to a mobility management entity, and/or the home subscriber server functionality corresponds, dependent on the access technology used, to a home subscriber server or to a home location register.

Thereby it is advantageously possible to provide the roaming services by using one or more different kinds of serving core network nodes—for example a mobile-services switching center (MSC) and serving general packet radio services (GPRS) support node (SGSN) in a global system for mobile communications (GSM) or universal mobile telecommunications system (UMTS) cellular network. It is thereby advantageously possible that it can be avoided that each serving core network node maintains its own relation with a further home subscriber server functionality of the further mobile communication network. Preferably, only the home subscriber server functionality of the mobile communication network communicates with the further mobile communication network such that the serving core network nodes may dispense with independently retrieving the second subscription profile data from the respective further home subscriber server of the further mobile communication network.

According to the present invention, it is preferred that, in the second and third step, the home subscriber server functionality mimics a serving core network node functionality for the communication with the further home subscriber server functionality such that the further home subscriber server functionality uses its existing capability to communicate with the serving core network node, wherein in case that the serving core network node is a MSC, the HSS communicates with the further HSS as if the HSS were a MSC, preferably by using a D interface, in case that the serving core network node is a SGSN, the HSS communicates with the further HSS as if the HSS were a SGSN, preferably by using a Gr or S6d interface, in case that the serving core network node is a MME, the HSS communicates with the further HSS as if the HSS were a MME, preferably by using the S6a interface.

According to a further preferred embodiment of the present invention, between the home subscriber server functionality and the further home subscriber server functionality, a protocol is used as if the second request message came from the serving core network node and as if the first response message were to be transmitted to the serving core network node.

Thereby it is advantageously possible to provide roaming services to the user equipment of an inbound roamer in a technically simple and efficient manner, wherein only the home subscriber server functionality—but not the serving core network node—has to be configured for using protocols required for communication with the further mobile communication network.

The present invention also relates to a mobile communication network for providing roaming services to a user equipment, the mobile communication network comprising a core network and an access network, the access network of the mobile communication network comprising at least one radio cell being served by a base station entity, wherein the user equipment is able to be attached to the mobile communication network via the base station entity despite the user equipment being related to a further mobile communication network as the home public land mobile network of the user equipment, wherein the core network comprises a serving core network node and a home subscriber server functionality, wherein the mobile communication network is configured such that the serving core network node provides mobility management functionality regarding the base station entity and thereby provides mobility management functionality regarding the user equipment, wherein the further mobile communication network comprises a further core network, the further core network comprising a further home subscriber server functionality, the further home subscriber server functionality being able to provide subscription profile data regarding the user equipment, wherein the mobile communication network is configured such that upon attachment of the user equipment with the mobile communication network:

the serving core network node requests, from the home subscriber server functionality and via a first request message, subscription profile data regarding the user equipment, the home subscriber server functionality requests, from the further home subscriber server functionality and via a second request message, subscription profile data regarding the user equipment, the further home subscriber server functionality transmits, via a first response message, first subscription profile data regarding the user equipment to the home subscriber server functionality, and the home subscriber server functionality transmits, via a second response message, second subscription profile data to the serving core network node having requested subscription profile data via the first request message, the second subscription profile data corresponding at least in part to the first subscription profile data.

It is thereby advantageously possible to provide a mobile communication network (serving network) for providing roaming services to a user equipment, wherein the disadvantages of the state of the art are avoided such that operational costs of the mobile communication network are reduced. Nevertheless, the service level of the mobile telecommunications network is preserved or even extended. By providing the home subscriber server functionality for requesting subscription profile data regarding the user equipment from the further home subscriber server functionality and for receiving the first subscription profile data regarding the user equipment from the further home subscriber server functionality, it is advantageously possible that a mobile communication network is provided, which has a relatively simple serving core network node. Furthermore, the technical efforts for providing the roaming services are reduced, especially in case that the mobile communication network provides the roaming services to a number of user equipments, each of which being related to a number of distinct further mobile communication networks. In particular, the maintenance efforts are especially reduced with respect to the state of the art, when the serving network and the further mobile communication network are configured to use different standards according to different specification releases and/or when the home network is updated to a newer specification release. It is thereby advantageously possible to use interoperable versions of the communication protocols for the communication between the mobile communication network and the further mobile communication network in a technically simple and relatively efficient manner.

According to the present invention, it is preferred—especially with respect to the mobile communication network—that the mobile communication network is configured such that the serving core network node provides mobility management functionality, besides regarding the user equipment, also regarding a non-roaming user equipment attached to the mobile communication network, and the home subscriber server functionality provides, upon request by the serving core network node, non-roaming subscription profile data regarding the non-roaming user equipment to the serving core network node.

Thereby it is advantageously possible to further simplify the communication of the serving network with the inbound roamer's home network such that—preferably the same home subscriber server (HSS) functionality node—may serve both the non-roaming users and inbound roamers from either all or specific further mobile communication networks (or foreign home networks).

Furthermore, it is preferred—with respect to the mobile communication network—that the mobile communication network is configured such that the second subscription profile data differ with respect to the first subscription profile data such that:

a mobile communication service that is available or allowed in the mobile communication network but is lacking or prohibited in the further mobile communication network is enabled for the user equipment attached to the mobile communication network, and/or a radio access technology that is available or allowed in the mobile communication network but is lacking or prohibited in the further mobile communication network is enabled for the user equipment attached to the mobile communication network, and/or a mobile communication service that is lacking or prohibited in the mobile communication network but is available or allowed in the further mobile communication network is disabled for the user equipment attached to the mobile communication network, and/or a radio access technology that is lacking or prohibited in the mobile communication network but is available or allowed in the further mobile communication network is disabled for the user equipment attached to the mobile communication network, and/or the second subscription profile data correspond to subscription profile data generated in view of the mobile communication services of the mobile communication network available to the user equipment, wherein the subscription profile data is adapted to the first subscription profile data.

Thereby it is advantageously possible to provide a mobile communication network, wherein inbound roamers are enabled to use access network technologies and/or services, which may be unavailable or not configured for the inbound roamer in the inbound roamer's home network. In particular, the inbound roamer may use services of the serving network even when a subscription profile of the inbound roamer does not contain parameters required for the corresponding service. According to one example, the inbound roamer is enabled to use the long term evolution (LTE) standard for wireless communication which is not provisioned for the inbound roamer in the inbound roamer's home network. It is thereby advantageously possible to even extend the roaming services for the user equipment with regard to the state of the art.

Furthermore, it is preferred with respect to the mobile communication network—that the serving core network node corresponds, dependent on the access technology used, to a mobile switching center and/or to a serving GPRS (General Packet Radio System) support node and/or to a mobility management entity, and/or the home subscriber server functionality corresponds, dependent on the access technology used, to a home subscriber server or to a home location register.

Thereby it is advantageously possible to provide a mobile communication network comprising one or more different kinds of serving core network nodes—for example a mobile-services switching center (MSC) and serving general packet radio services (GPRS) support node (SGSN) in a global system for mobile communications (GSM) or universal mobile telecommunications system (UMTS) cellular network. It is thereby advantageously possible that it can be avoided that each serving core network node maintains its own relation with a further home subscriber server functionality of the further mobile communication network. Preferably, only the home subscriber server functionality of the mobile communication network communicates with the further mobile communication network such that the serving core network nodes may dispense with independently retrieving the second subscription profile data from the respective further home subscriber server of the further mobile communication network.

Furthermore, it is preferred—with respect to the mobile communication network—that the mobile communication network is configured such that between the home subscriber server functionality and the further home subscriber server functionality, a protocol is used as if the second request message came from the serving core network node and as if the first response message were to be transmitted to the serving core network node.

Thereby it is advantageously possible to provide a mobile communication network, wherein only the home subscriber server functionality—but not the serving core network node—has to be configured for using protocols required for communication with the further mobile communication network.

Furthermore, it is preferred—with respect to the mobile communication network—that the home subscriber server functionality comprises:

a first part for roaming user equipments and a second part for non-roaming user equipment, and/or a first frontend part for roaming user equipments, a second frontend part for non-roaming user equipment, and a database part.

Thereby it is advantageously possible to hide the topology of the core network from the further mobile communication network (inbound roamer's home network) because only the home subscriber server functionality—in particular the first part or first frontend part for roaming user equipments—(but preferably no other node of the core network) is used for communication with the further mobile communication network. Preferably, the serving network is configured to hide any information being related to the use of the home subscriber server functionality instead of a serving core network node for the communications with the further mobile communication network.

The present invention also relates to a home subscriber server functionality node for providing home subscriber server functionality in a mobile communication network according to the present invention.

It is thereby advantageously possible to use only the home subscriber server functionality—but not the serving core network node—for the communication with the further mobile communication network.

Furthermore, the present invention relates to a program comprising a computer readable program code which, when executed on a computer or on a serving core network node of a mobile communication network or on a node providing home subscriber server functionality or partially on a serving core network node of the mobile communication network and partially on a node providing home subscriber server functionality, causes the computer or the serving core network node of the mobile communication network or the node providing home subscriber server functionality to perform a method according to the present invention.

The present invention also relates to a computer program product for using a telecommunications network, the computer program product comprising a computer program stored on a storage medium, the computer program comprising program code which, when executed on a computer or on a serving core network node of a mobile communication network or on a node providing home subscriber server functionality or partially on a serving core network node of the mobile communication network and partially on a node providing home subscriber server functionality, causes the computer or the serving core network node of the mobile communication network or the node providing home subscriber server functionality to perform a method according to the present invention.

It is, however, to be understood that the implementation of the inventive method does not necessarily need to rely on physical machines such as hardware components or the like. The computer or the serving core network node of the mobile communication network or the node providing home subscriber server functionality can also be realized via virtual machines. Preferably, a "program" can also be realized in the form of a distributed program.

These and other characteristics, features and advantages of the present invention will become apparent from the following detailed description, taken in conjunction with the accompanying drawings, which illustrate, by way of example, the principles of the invention. The description is given for the sake of example only, without limiting the scope of the invention. The reference figures quoted below refer to the attached drawings.

The present invention will be described with respect to particular embodiments and with reference to certain drawings but the invention is not limited thereto but only by the claims. The drawings described are only schematic and are non-limiting. In the drawings, the size of some of the elements may be exaggerated and not drawn on scale for illustrative purposes.

Where an indefinite or definite article is used when referring to a singular noun, e.g. "a", "an", "the", this includes a plural of that noun unless something else is specifically stated.

Furthermore, the terms first, second, third and the like in the description and in the claims are used for distinguishing between similar elements and not necessarily for describing a sequential or chronological order. It is to be understood that the terms so used are interchangeable under appropriate circumstances and that the embodiments of the invention described herein are capable of operation in other sequences than described or illustrated herein.

In FIG. 1, a mobile communication network 100 for providing mobility management functionality to a non-roaming user equipment 25 is schematically illustrated. The mobile communication network comprises a core network 120 and an access network 110, wherein the access network 110 of the mobile communication network 100 comprises at least one radio cell, the at least one radio cell being served by a base station entity 111. Here, a non-roaming case is illustrated, wherein a non-roaming user equipment 25 is able to be attached to the mobile communication network 100 via the base station entity 111. The non-roaming user equipment 25 is related to the mobile communication network 100 as the home public land mobile network of the non-roaming user equipment 25.

The core network 120 comprises a serving core network node 121 and a home subscriber server functionality 125, wherein the mobile communication network 100 is configured such that the serving core network node 121 provides mobility management functionality regarding the base station entity 111. The serving core network node 121 provides mobility management functionality to the non-roaming user equipment 25 upon attachment of the non-roaming user equipment 25 to the mobile communication network 100. Here, the non-roaming user equipment is attached to its own home public land mobile network. Thus, upon request by the serving core network node 121, the home subscriber server functionality 125 provides non-roaming subscription profile data regarding the non-roaming user equipment 25 to the serving core network node 121. This means, in particular, that the subscription profile data are exchanged within the home public land mobile network of the non-roaming user equipment 25.

Figure 2:
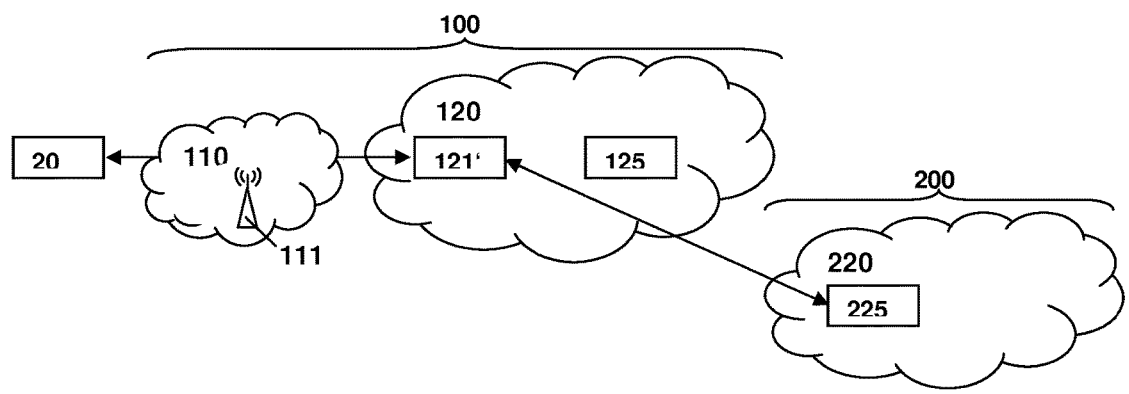
FIG. 2 schematically illustrates a mobile communication network for providing roaming services to a user equipment.

In FIG. 2, a mobile communication network 100 for providing roaming services to a user equipment 20 is schematically illustrated, wherein a roaming case is illustrated. In the roaming case, a user equipment 20 is able to be attached to the mobile communication network 100 via the base station entity 111 despite the user equipment 20 being related to a further mobile communication network 200 as the home public land mobile network of the user equipment 20. Thereby, the further mobile communication network 200 comprises a further core network 220 having a further home subscriber server functionality 225. The further home subscriber server functionality 225 is able to provide subscription profile data regarding the user equipment 20. Here—in contrast to the non-roaming case illustrated in FIG. 1—the mobile communication network 100 is configured such that, upon attachment of the user equipment 20 with the mobile communication network, a further serving core network node (as indicated by reference numeral 121') requests, (directly) from the further home subscriber server functionality 225, subscription profile data regarding the user equipment 20. In return, the further home subscriber server functionality 225 transmits subscription profile data regarding the user equipment 20 to the home subscriber server functionality 125, in particular such that the subscription profile data are specifically adapted to the requesting further serving core network node 121'. Here, the subscription profile data are exchanged directly between the further serving core network node (as indicated by reference numeral 121') and the further home subscriber server functionality 225 of the further mobile communication network 200.

Figure 3:
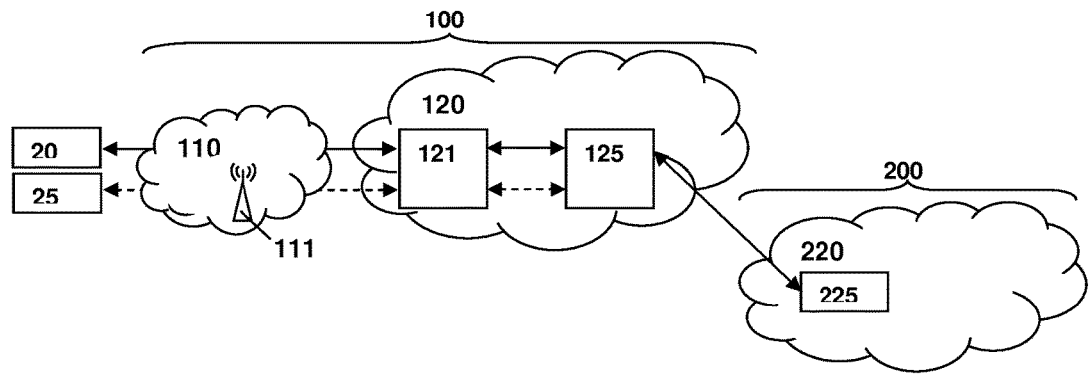
FIGS. 3 to 5 schematically illustrate a mobile communication network according to the present invention, wherein roaming services are provided to a user equipment.

In FIG. 3, a mobile communication network 100 according to the present invention is schematically illustrated, wherein a serving core network node 121 provides roaming services to the user equipment 20, and wherein the serving core network node 121 provides mobility management functionality—besides regarding the user equipment 20—also regarding the non-roaming user equipment 25.

With regard to the non-roaming user equipment 25, when the non-roaming user equipment 25 is attached to the mobile communication network 100, the home subscriber server functionality 125 provides, upon request by the serving core network node 121, non-roaming subscription profile data regarding the non-roaming user equipment 25 to the serving core network node 121. But, with regard to the roaming case, when the user equipment 20 is attached to the mobile communication network 100, the serving core network node 121 requests from the home subscriber server functionality 125, and via a first request message, subscription profile data regarding the user equipment 20. Subsequently, the home subscriber server functionality 125 requests, from the further home subscriber server functionality 225 and via a second request message, subscription profile data regarding the user equipment 20. Thus, only the home subscriber server functionality 125—but not the serving core network node 121—is thereby preferably used for the communication with the further home subscriber server functionality 225.

In response to the request of the home subscriber server functionality 125, the further home subscriber server functionality 225 transmits to the home subscriber server functionality 125, via a first response message, first subscription profile data regarding the user equipment 20. The home subscriber server functionality 125 then transmits, via a second response message, second subscription profile data to the serving core network node 121, which has requested the subscription profile data via the first request message. Thereby, the serving core network node 121 communicates preferably only with the home subscriber server functionality 125—but not with the further home subscriber server functionality 225 of the further mobile communication network 200. The second subscription profile data being transmitted by the home subscriber server functionality 125 correspond at least in part to the first subscription profile data. In particular, the second subscriber profile data are thereby specifically adapted to the access technology being used by the serving core network node 121—wherein the serving core network node 121 is, for example, a MSC, a SGSN, or a MME.

Preferably, during attachment of the user equipment 20 to the mobile communication network 100, the home subscriber server functionality 125 comprises a local copy of the second subscription profile data. The home subscriber server functionality 125 and the further home subscriber server functionality 225 exchange and/or update first subscriber-related data regarding the user equipment 20. Additionally or alternatively, the serving core network node 121 and the home subscriber server functionality 125 exchange and/or update second subscriber-related data regarding the user equipment 20. According to an alternative embodiment of the present invention, the first subscriber-related data are exchanged and/or updated upon request by the further home subscriber server functionality 225. According to another alternative embodiment of the present invention, the first subscriber-related data are exchanged and/or updated upon request by the home subscriber server functionality 125. According to a still further alternative embodiment of the present invention, the second subscriber-related data are exchanged and/or updated upon request by the serving core network node 121 or upon request by the home subscriber server functionality 125. For example, the first and/or second subscriber-related data are related to a location request being carried out while the user equipment 20 is attached with the mobile communication network 100. According to another example, the first and/or second subscriber-related data are related to an update of subscriber-related data being carried out while the user equipment 20 is attached with the mobile communication network 100.

Figure 4:
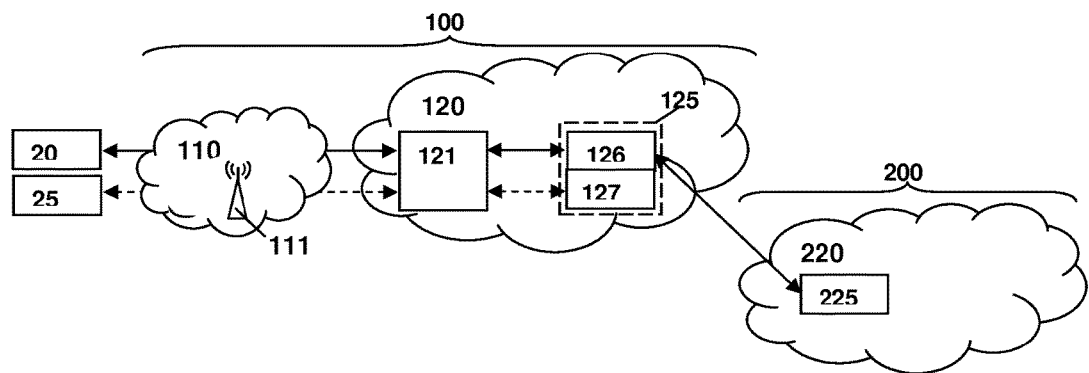
Figure 5:
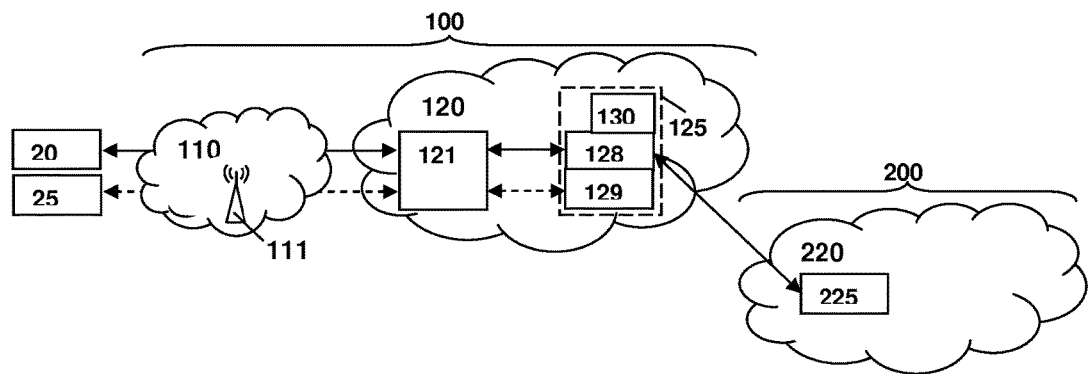

In FIG. 4, a mobile communication network 100 according to the present invention is schematically illustrated, wherein roaming services are provided to the user equipment 20, and wherein the home subscriber server functionality 125 comprises a first part 126 for roaming user equipments 20 and a second part 127 for non-roaming user equipment 25. In FIG. 5, a mobile communication network 100 according to the present invention is schematically illustrated, wherein roaming services are provided to the user equipment 20, and wherein the home subscriber server functionality 125 comprises a first frontend part 128 for roaming user equipments 20, a second frontend part 129 for non-roaming user equipment 25, and a database part 130. It is thereby advantageously possible to enable the mobile communication network 100 to hide from the further mobile communication network 200 that a home subscriber server functionality 125 is used instead of a serving core network 121 for the communication with the further home subscriber server functionality 225 of the further mobile communication network 200.

While the invention has been illustrated and described in detail in the drawings and foregoing description, such illustration and description are to be considered illustrative or exemplary and not restrictive. It will be understood that changes and modifications may be made by those of ordinary skill within the scope of the following claims. In particular, the present invention covers further embodiments with any combination of features from different embodiments described above and below. Additionally, statements made herein characterizing the invention refer to an embodiment of the invention and not necessarily all embodiments.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

The invention claimed is:

1. A method for providing roaming services for a roaming user equipment within a visited mobile communication network, the visited mobile communication network comprising a core network and an access network, the access network comprising at least one radio cell being served by a base station entity, wherein a home mobile communication network is a home public land mobile network of the roaming user equipment, wherein the core network comprises a serving core network node and a home subscriber server functionality node of the visited mobile communication network, wherein the serving core network node provides mobility management functionality regarding the base station entity and the roaming user equipment, wherein the home mobile communication network comprises a further core network, the further core network comprising a home subscriber server functionality node of the home mobile communication network, the home subscriber server functionality node of the home mobile communication network being configured to provide subscription profile data regarding the roaming user equipment, wherein the method comprises:

upon attachment of the roaming user equipment with the visited mobile communication network, in a first step, the serving core network node requests, from the home subscriber server functionality node of the visited mobile communication network and via a first request message, subscription profile data regarding the roaming user equipment, in a second step, subsequent to the first step, the home subscriber server functionality node of the visited mobile communication network requests, from the home subscriber server functionality node of the home mobile communication network and via a second request message, subscription profile data regarding the roaming user equipment, in a third step, subsequent to the second step, the home subscriber server functionality node of the visited mobile communication network receives, via a first response message, first subscription profile data regarding the roaming user equipment from the home subscriber server functionality node of the home mobile communication network, and in a fourth step, subsequent to the third step, the home subscriber server functionality node of the visited mobile communication network transmits, via a second response message, second subscription profile data to the serving core network node, the second subscription profile data corresponding at least in part to the first subscription profile data;

wherein the serving core network node further provides mobility management functionality for a non-roaming user equipment attached to the visited mobile communication network; and wherein the home subscriber server functionality node of the visited mobile communication network provides, upon request by the serving core network node, non-roaming subscription profile data regarding the non-roaming user equipment to the serving core network node.

2. The method according to claim 1, wherein while the roaming user equipment is attached with the visited mobile communication network, the home subscriber server functionality node of the visited mobile communication network comprises a local copy of the second subscription profile data, and wherein the method further comprises the following steps:
the home subscriber server functionality node of the visited mobile communication network and the home subscriber server functionality node of the home mobile communication network exchange and/or update first subscriber-related data regarding the roaming user equipment, and/or
the serving core network node and the home subscriber server functionality node of the visited mobile communication network exchange and/or update second subscriber-related data regarding the roaming user equipment.

3. The method according to claim 1, wherein the second subscription profile data differ with respect to the first subscription profile data such that:
- a mobile communication service that is available or allowed in the visited mobile communication network but is lacking or prohibited in the home mobile communication network is enabled for the roaming user equipment attached to the visited mobile communication network, and/or
- a radio access technology that is available or allowed in the visited mobile communication network but is lacking or prohibited in the home mobile communication network is enabled for the roaming user equipment attached to the visited mobile communication network, and/or
- a mobile communication service that is lacking or prohibited in the visited mobile communication network but is available or allowed in the home mobile communication network is disabled for the roaming user equipment attached to the visited mobile communication network, and/or
- a radio access technology that is lacking or prohibited in the visited mobile communication network but is available or allowed in the home mobile communication network is disabled for the roaming user equipment attached to the visited mobile communication network, and/or
- the second subscription profile data correspond to subscription profile data generated in view of the mobile communication services of the visited mobile communication network available to the roaming user equipment, wherein the subscription profile data is adapted to the first subscription profile data.

4. The method according to claim 1, wherein the serving core network node corresponds, dependent on the access technology used, to a mobile switching center and/or to a serving General Packet Radio System (GPRS) support node and/or to a mobility management entity, and/or
- wherein the home subscriber server functionality node of the visited mobile communication network correspond, dependent on the access technology used, to a home subscriber server or to a home location register.

5. The method according to claim 1, wherein between the home subscriber server functionality node of the visited mobile communication network and the home subscriber server functionality node of the home mobile communication network, a protocol is used as if the second request message came from the serving core network node and as if the first response message were to be transmitted to the serving core network node.

6. The method according to claim 1, wherein in the first step, the serving core network node requests, from the home subscriber server functionality node of the visited mobile communication network and via the first request message, the subscription profile data regarding the roaming user equipment in the same manner as if the serving core network node was serving a non-roaming subscriber.

7. The method according to claim 1, wherein the home subscriber server functionality node of the visited mobile communication network serves both non-roaming user equipments of the visited mobile communication network and inbound roaming user equipments from a plurality of other mobile communication networks.

8. A visited mobile communication network for providing roaming services to a roaming user equipment, the visited mobile communication network comprising:
- a core network; and
- an access network, the access network comprising at least one radio cell being served by a base station entity;
- wherein a home mobile communication network is a home public land mobile network of the roaming user equipment;
- wherein the core network comprises a serving core network node and a home subscriber server functionality node of the visited mobile communication network, wherein the serving core network node is configured to provide mobility management functionality regarding the base station entity and the roaming user equipment;
- wherein the home mobile communication network comprises a further core network, the further core network comprising a home subscriber server functionality node of the home mobile communication network, the home subscriber server functionality node of the home mobile communication network being configured to provide subscription profile data regarding the roaming user equipment;
- wherein the serving core network node and the home subscriber server functionality node of the visited mobile communication network are configured such that upon attachment of the roaming user equipment with the visited mobile communication network:
  - the serving core network node requests, from the home subscriber server functionality node of the visited mobile communication network and via a first request message, subscription profile data regarding the roaming user equipment,
  - the home subscriber server functionality node of the visited mobile communication network requests, from the home subscriber server functionality node of the home mobile communication network and via a second request message, subscription profile data regarding the roaming user equipment,
  - the home subscriber server functionality node of the visited mobile communication network receives, via a first response message, first subscription profile data regarding the roaming user equipment from the home subscriber server functionality node of the home mobile communication network, and
  - the home subscriber server functionality node of the visited mobile communication network transmits, via a second response message, second subscription profile data to the serving core network node, the second subscription profile data corresponding at least in part to the first subscription profile data;
- wherein the serving core network node and the home subscriber server functionality node of the visited mobile communication network are configured such that:
  - the serving core network node further provides mobility management functionality regarding a non-roaming user equipment attached to the visited mobile communication network, and
  - the home subscriber server functionality node of the visited mobile communication network provides, upon request by the serving core network node, non-roaming subscription profile data regarding the non-roaming user equipment to the serving core network node.

9. The visited mobile communication network according to claim 7, wherein the second subscription profile data differ with respect to the first subscription profile data such that:
- a mobile communication service that is available or allowed in the visited mobile communication network but is lacking or prohibited in the home mobile communication network is enabled for the roaming user equipment attached to the visited mobile communication network, and/or a radio access technology that is available or allowed in the visited mobile communication network but is lacking or prohibited in the home mobile communication network is enabled for the roaming user equipment attached to the visited mobile communication network, and/or a mobile communication service that is lacking or prohibited in the visited mobile communication network but is available or allowed in the home mobile communication network is disabled for the roaming user equipment attached to the visited mobile communication network, and/or a radio access technology that is lacking or prohibited in the visited mobile communication network but is available or allowed in the home mobile communication network is disabled for the roaming user equipment attached to the visited mobile communication network, and/or the second subscription profile data correspond to subscription profile data generated in view of the mobile communication services of the visited mobile communication network available to the roaming user equipment, wherein the subscription profile data is adapted to the first subscription profile data.

10. The visited mobile communication network according to claim 7, wherein the serving core network node corresponds, dependent on the access technology used, to a mobile switching center and/or to a serving General Packet Radio System (GPRS) support node and/or to a mobility management entity, and/or wherein the home subscriber server functionality node of the visited mobile communication network corresponds, dependent on the access technology used, to a home subscriber server or to a home location register.

11. The visited mobile communication network according to claim 8, wherein the home subscriber server functionality node of the visited mobile communication network and the home subscriber server functionality node of the home mobile communication network are configured to use a protocol as if the second request message came from the serving core network node and as if the first response message were to be transmitted to the serving core network node.

12. The visited mobile communication network according to claim 8, wherein home subscriber server functionality comprises:

a first part for roaming user equipments and a second part for non-roaming user equipments, and/or a first frontend part for roaming user equipments, a second frontend part for non-roaming user equipments, and a database part.

13. One or more non-transitory computer-readable media having processor-executable instructions stored thereon, the processor-executable instructions, when executed, facilitating performance of a method for providing roaming services for a roaming user equipment within a visited mobile communication network, the visited mobile communication network comprising a core network and an access network, the access network comprising at least one radio cell being served by a base station entity, wherein a home mobile communication network is a home public land mobile network of the roaming user equipment, wherein the core network comprises a serving core network node and a home subscriber server functionality node of the visited mobile communication network, wherein the serving core network node provides mobility management functionality regarding the base station entity and the roaming user equipment, wherein the home mobile communication network comprises a further core network, the further core network comprising a home subscriber server functionality node of the home mobile communication network, the home subscriber server functionality node of the home mobile communication network being configured to provide subscription profile data regarding the roaming user equipment, wherein the method comprises:

upon attachment of the roaming user equipment with the visited mobile communication network, in a first step, the serving core network node requests, from the home subscriber server functionality node of the visited mobile communication network and via a first request message, subscription profile data regarding the roaming user equipment, in a second step, subsequent to the first step, the home subscriber server functionality node of the visited mobile communication network requests, from the home subscriber server functionality node of the home mobile communication network and via a second request message, subscription profile data regarding the roaming user equipment, in a third step, subsequent to the second step, the home subscriber server functionality node of the visited mobile communication network receives, via a first response message, first subscription profile data regarding the roaming user equipment from the home subscriber server functionality node of the home mobile communication network, and in a fourth step, subsequent to the third step, the home subscriber server functionality node of the visited mobile communication network transmits, via a second response message, second subscription profile data to the serving core network node, the second subscription profile data corresponding at least in part to the first subscription profile data;

wherein the serving core network node further provides mobility management functionality regarding a non-roaming user equipment attached to the visited mobile communication network; and wherein the home subscriber server functionality node of the visited mobile communication network provides, upon request by the serving core network node, non-roaming subscription profile data regarding the non-roaming user equipment to the serving core network node.

* * * * *